(12) United States Patent
Dinh et al.

(10) Patent No.: US 7,129,849 B2
(45) Date of Patent: Oct. 31, 2006

(54) ANALOG INSTRUMENT GAUGE DISPLAY

(75) Inventors: Nancy Dinh, Grand Blanc, MI (US);
Andrew R Krenz, Troy, MI (US);
Cecile M Giroux, Grosse Pointe, MI
(US); David Bolognino, Oxford, MI
(US)

(73) Assignee: General Motors Corporation, Detroit, MI (US)

( * ) Notice: Subject to any disclaimer, the term of this patent is extended or adjusted under 35 U.S.C. 154(b) by 195 days.

(21) Appl. No.: 10/965,618

(22) Filed: Oct. 14, 2004

(65) Prior Publication Data
US 2005/0139143 A1 Jun. 30, 2005

Related U.S. Application Data

(60) Provisional application No. 60/533,747, filed on Dec. 30, 2003.

(51) Int. Cl.
*G08B 21/00* (2006.01)

(52) U.S. Cl. ............... 340/688; 340/691.1; 340/691.6; 340/815.78; 116/47; 116/284; 116/288; 116/290; 116/309

(58) Field of Classification Search ............... 340/688, 340/691.1, 691.6, 815.4, 815.78, 815.86, 340/441; 116/284, 288, 290, 309, 310, 46–49; 40/432–441
See application file for complete search history.

(56) References Cited

U.S. PATENT DOCUMENTS

| 5,166,610 | A | * | 11/1992 | Bezos et al. | 324/160 |
| 5,556,187 | A | * | 9/1996 | Furuya et al. | 362/27 |
| 2006/0092098 | A1 | * | 5/2006 | Yokota et al. | 345/33 |

* cited by examiner

*Primary Examiner*—Toan N. Pham
(74) *Attorney, Agent, or Firm*—Laura C. Hargitt

(57) ABSTRACT

An analog instrument gauge display is provided that comprises a lens having a pointing indicia displayed thereon, a back plate having a pattern thereon, and a drive motor coupled to the lens and configured to rotate the lens and pointing indicia relative to the pattern on the back plate in response to receipt of a signal.

21 Claims, 4 Drawing Sheets

ANALOG INSTRUMENT GAUGE DISPLAY

CROSS-REFERENCES TO RELATED APPLICATIONS

This application claims the benefit of U.S. Provisional Application No. 60/533,747 filed Dec. 30, 2003.

TECHNICAL FIELD

The present invention generally relates to instrument gauge displays, and more particularly relates to a post-less analog instrument gauge displays for use in motor vehicle applications.

BACKGROUND

Analog instrument gauge displays are the most common instrument gauge display types in motor vehicles for relating vehicle speed, engine speed, coolant temperature, time, and the like to the driver. This gauge display type, which has a moving needle or needles set in front of a stationary patterned back plate, is useful for quickly imparting vehicle or other information to the motor vehicle driver. Many vehicle drivers find an analog display is less distracting and more easily read in a variety of conditions than is a digital display.

Almost all analog gauge displays rely on the instrument gauge needle or needles being attached to a post that is substantially perpendicular to the back plate of the gauge. The display needle post extends outwardly from the back plate proximate the center of the gauge, and is connected directly or indirectly through gearing, a linkage, or the like to a motor that drives the gauge needle. The motor receives signals from the engine control unit or other computer control, and then turns the post, and thus the needle, in response to the signals, so that the gauge needle points to the correct value on the gauge face.

Unfortunately, the fact that this needle post extends outwardly from roughly the center of the back plate limits the useable space on the gauge back plate. It is difficult to increase the functionality of an existing gauge by adding graphics in the form of a liquid crystal display (LCD) or other display to the gauge back plate because the needle post takes up the center of the back plate. Currently, motor vehicle manufacturers have skirted this problem by using LCDs that are small enough to fit on the useable space on the back plate, away from the center of the back plate, or they place the LCD in front of the needle on the gauge. Both of these solutions, however, create vision-related problems, as they make the display more difficult to read in a glance and thus make it more difficult to assimilate the information being displayed.

Accordingly, it is desirable to have an analog instrument gauge display that is configured to display more information, in a more readily assimilated manner, than do presently available displays. Furthermore, other desirable features and characteristics of the present invention will become apparent from the subsequent detailed description and the appended claims, taken in conjunction with the accompanying drawings and the foregoing technical field and background.

BRIEF SUMMARY

An improved analog instrument gauge display is provided in accordance with an embodiment of the invention. The analog gauge instrument display in accordance with that embodiment comprises a lens having a pointing indicia displayed thereon, a back plate having a pattern thereon, and a drive motor coupled to the lens and configured to rotate the lens and pointing indicia relative to the pattern on the back plate in response to receipt of a signal.

BRIEF DESCRIPTION OF THE DRAWINGS

The present invention will hereinafter be described in conjunction with the following drawing figures, wherein like numerals denote like elements, and wherein FIGS. 1–3 schematically illustrates, in cross-sectional view, exploded view, and plan view, respectively, a single-needle analog instrument gauge display in accordance with an embodiment of the invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In accordance with an embodiment of the invention, an analog instrument gauge display, for example for application on the instrument panel of a motor vehicle, utilizes a gauge face that comprises a revolving transparent lens with an integral pointing indicia, hereinafter referred to as a "needle." Although referred to as a "needle," the pointing indicia can have any shape or form, such as an arrow, elongated triangle, offset circle or dot, or the like. The lens is attached to a lens carrier ring, and the lens carrier ring is rotated by mechanical means (hidden behind the instrument panel surface). In this way the needle, etched, painted, or otherwise displayed on the lens, is swiveled and oriented to the proper value relative to a pattern applied to a back plate that is positioned behind the transparent lens. Because the mechanical hardware that positions the needle is external to the viewable gauge area, the needle is "post-less" and appears to be floating. The driver of the motor vehicle thus has an unobstructed view of the analog gauge; and all of the gauge face and the back plate is available for graphics or other displays such as digital displays in the form of, for example, liquid crystal displays (LCDs). In accordance with further embodiments of the invention, multiple needles can be used on a single gauge by positioning multiple lenses (and associated pointing indicia) on top of one another. The multiple lenses can be rotated independently of each other by independent carrier rings concentrically located one inside the other.

Figure 1:
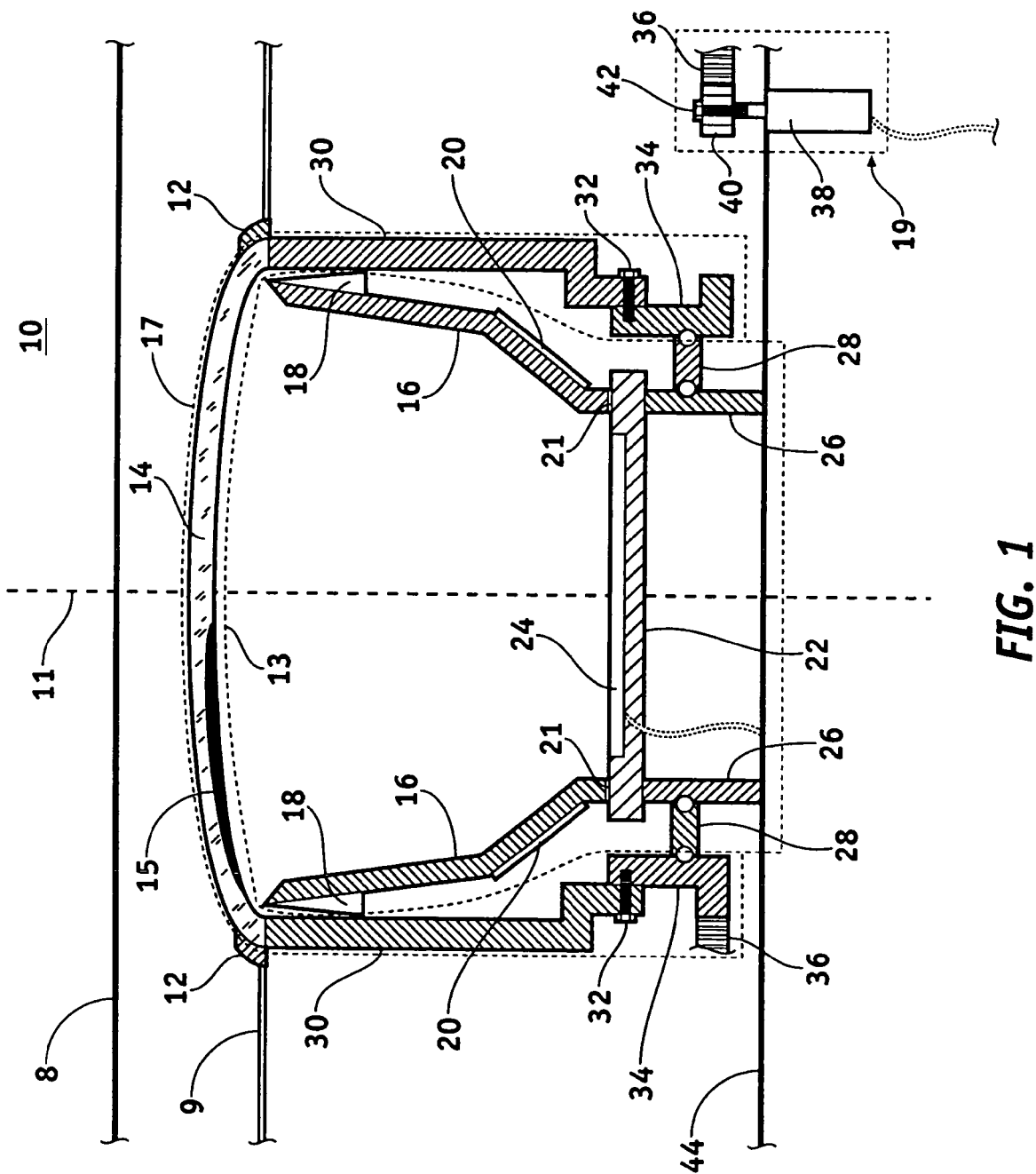
Figure 2:
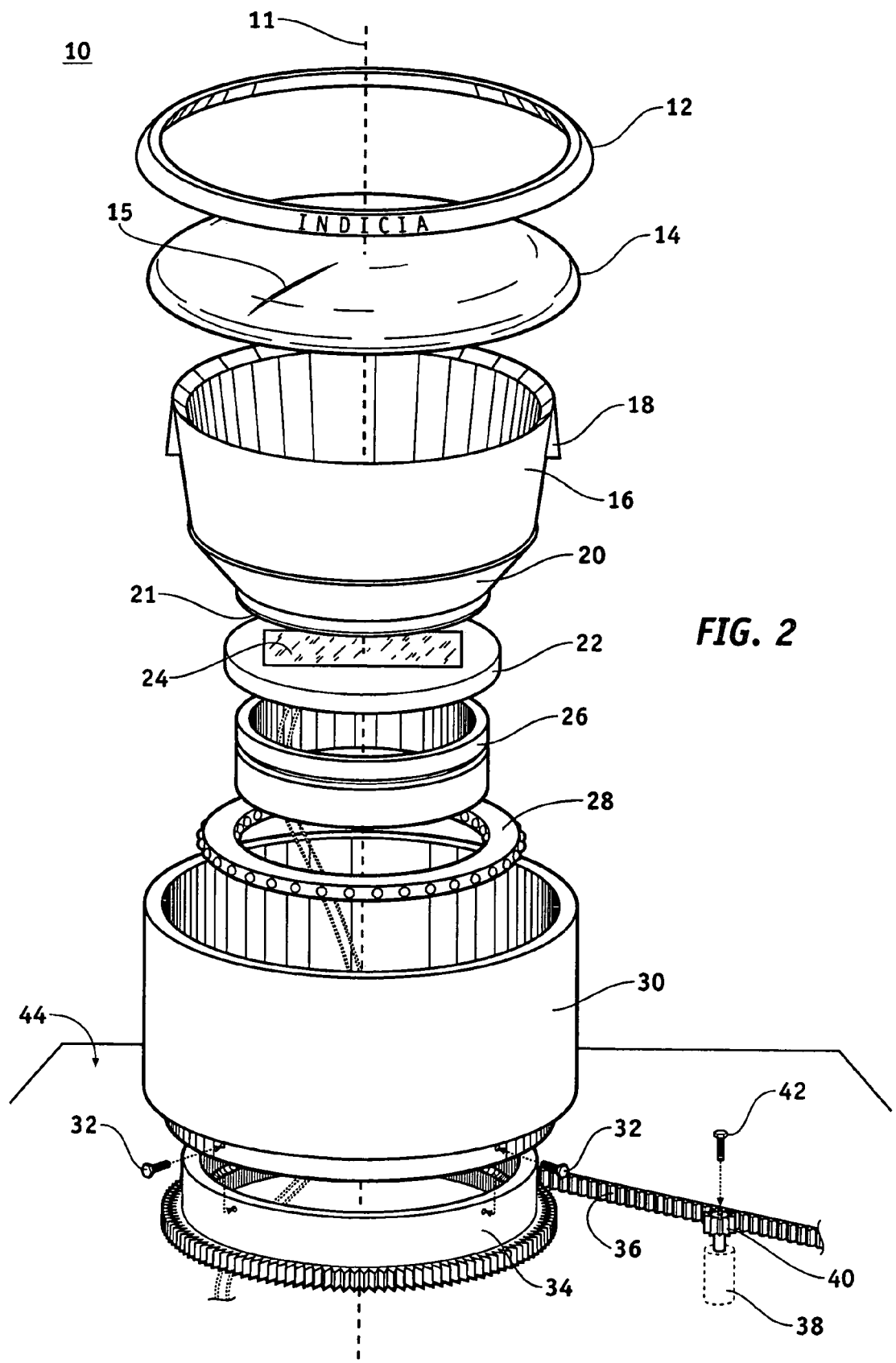
Figure 3:
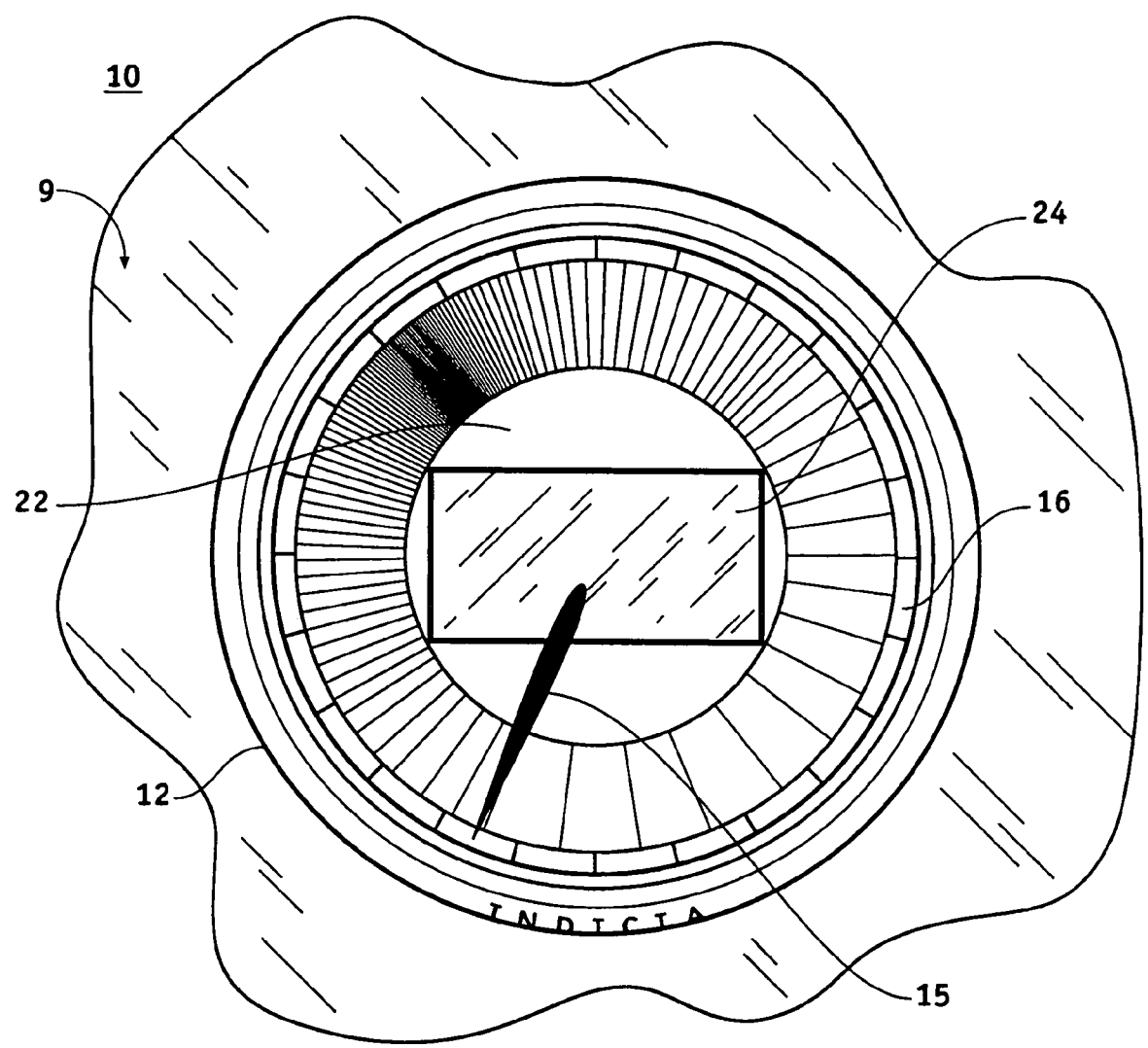

FIGS. 1–3 schematically illustrate a single-needle analog instrument gauge display 10, in accordance with the invention, in cross sectional, exploded, and plan view, respectively. Single-needle analog instrument gauge display 10 may be any motor vehicle related single needle instrument gauge, such as a speedometer, tachometer, engine coolant gauge, or the like. Single-needle analog instrument gauge display 10, in accordance with one embodiment of the invention, comprises three subassemblies: stationary gauge subassembly 13, rotating lens subassembly 17, and drive motor subassembly 19.

The stationary gauge subassembly of this embodiment of the invention comprises analog gauge face canister 16, gauge back plate 22, and gauge mounting tube 26. In accordance with a preferred embodiment of the invention, stationary gauge assembly 13 further comprises side lights 18 and gauge face lights 20 as will be explained below. Rotating lens subassembly 17 comprises transparent lens 14, pointing indicia or needle 15, lens carrier ring 30, sun gear 34, and concentric bearing 28. Drive motor subassembly 19 comprises drive motor 38, spur gear 40, and drive belt 36. In a preferred embodiment, drive motor 38 comprises a stepper motor. Further discussion of drive motor 38 will refer to the motor as a stepper motor although those of skill in the art will recognize that other motor forms may be used in this application.

Analog gauge face canister 16 and/or gauge back plate 22 is provided with a pattern comprising, for example, printed, embossed, stamped, or painted-on graphics on the inside (viewable) surface of the canister. Such pattern or graphics could be, for example, mile per hour indications if the gauge display is a speedometer, revolution per minute (rpm) indications if the gauge display is a tachometer, or the like. Attached to the outside (non-viweable) surface of the analog gauge face canister, in accordance with a preferred embodiment of the invention, are side lights 18 used to illuminate needle 15 of the rotating lens subassembly and gauge face lights 20 used to illuminate the gauge face of the rotating lens subassembly. Either or both side lights 18 and gauge face lights 20 may be incandescent lights, light emitting diodes, electro luminescent film, or the like. In a further embodiment of the invention, side lights 18 and gauge face lights 20 may be combined into one unit that illuminates both the gauge face and the lens needle. Gauge back plate 22 is attached to the bottom of analog gauge canister 15 with a light seal 21 that also functions as a damper to dampen out gauge vibrations. The inside (viewable) surface of gauge back plate 22 may contain graphics, as mentioned above, or, as in the illustrated embodiment in FIGS. 1–3, a liquid crystal or other digital display 24, hereinafter referred to without limitation as a liquid crystal display (LCD). The gauge back plate may also contain graphics in combination with a liquid crystal display. Liquid crystal display 24 may provide vehicular speed information, navigation information, or the like. The information displayed by the LCD may be the same as or different from the information conveyed by the analog display. For example, the LCD and the analog display may provide digital and analog representations, respectively, of the vehicle speed. Alternatively, the LCD and analog displays may provide the driver of the vehicle with information about complementary engine functions (for example vehicle speed and engine rpm) or dissimilar functions (for example vehicle speed and outside temperature). In accordance with a further embodiment of the invention, LCD 24 is provided with backlighting suitable for lighting the LCD, the gauge face, and the lens needle. Gauge back plate 22 is attached to gauge mount tube 26 by press fit, adhesives, set screws, or the like. The gauge mount tube is then attached rigidly to mounting plate 44 by adhesives, set screws, or the like. Mounting plate 44, in turn, is attached rigidly with respect to the motor vehicle dash board, under dash framing, or the like.

As is illustrated with continued reference to FIGS. 1–3, rotating lens subassembly 17 is configured to rotate about a fixed axis represented by dashed line 11. This axis is proximate the centerline of stationary gauge subassembly 13. Needle 15 can be laser-etched, painted, embossed, or otherwise applied to transparent lens 14. Lens 14 is rigidly connected to lens carrier ring 30 by means of a press-fit, adhesive, set screw, or the like. Stationary gauge subassembly 13 fits concentrically inside the hollow, cylindrical lens carrier ring so that analog gauge face canister 16 and gauge back plate 22 are visible to the driver through the transparent lens. Sun gear 34 is rigidly attached to lens carrier ring 30. In a preferred embodiment of the invention, a plurality of set screws 32 are used to connect the sun gear to the lens carrier ring although adhesives or a press fit or other attachment mechanism could be substituted. The sun gear may be a single tooth gear, a helical gear, or the like. In a preferred embodiment of the invention, the sun gear is a double tooth gear. Rotating lens subassembly 17 rides on, is maintained in a vertical position, and is supported by concentric bearing 28. Concentric bearing 28 may be a cartridge bearing, a set of ball bearings in a retainer ring, or the like. The concentric bearing is constrained vertically so that it does not move up and down within cylindrical gauge face carrier shaft 26 and permits rotation of rotating lens subassembly 17 about the gauge face carrier shaft. Concentric bearing 28 can be press fit onto gauge face carrier shaft 26 or can be constrained to a circular channel milled or otherwise formed around the circumference of the gauge face carrier shaft. Mounted in this manner, the lens carrier ring, and therefore the lens and needle, in accordance with a preferred embodiment of the invention, are restrained to one degree of movement, namely rotation about axis 11.

Stepper motor 38 and its associated circuitry (not illustrated) are configured to cause the stepper motor to rotate a predetermined number of degrees in response to signals received by the motor from the engine control module or other computer control (not illustrated). For example, if the analog gauge instrument display is designed to convey information concerning vehicle speed or engine rpm, the computer control receives information in the form of sensor signals from engine or vehicle sensors that measure vehicle speed or engine rpm. The computer control, in turn, transmits appropriate signals to the stepper motor to cause the stepper motor to rotate through an appropriate angular rotation to cause needle 15 to point to the appropriate position on the pattern on back plate 24 or analog gauge face canister 16. In a preferred embodiment stepper motor 38 is also configured with a "set point" to which the motor rotates to in the absence of any signal from the engine control module, or in the presence of a base line signal from the engine control module or other computer control. A spur gear 40 is attached rigidly to the drive shaft of stepper motor 38 using a press fit, set screw, adhesives, or the like. In a preferred embodiment of the invention, a shoulder bolt 42 attaches spur gear 40 to the drive shaft of stepper motor 38. Spur gear 40 may be a single tooth gear, a helical gear, or the like, but in a preferred embodiment of the invention, spur gear 40 is a double tooth gear. Spur gear 40 is connected to sun gear 34 by a flexible drive belt 36. Drive belt 36 may be a rubber belt drive, a steel chain, or the like. By using double tooth gears on the sun gear and on the spur gear, drive belt 36 can be constrained in a vertical direction and slippage from either of the gears is avoided. By using a flexible drive belt, mechanical tolerances in the positioning of the stepper motor relative to the rotating lens assembly are relaxed. The gearing ratio between sun gear 34 and spur gear 40 can be chosen such that a predetermined rotation of stepper motor 38 produces a set amount of rotation of sun gear 34. In this manner, when stepper motor 38 receives a signal from the engine control module or other computer control corresponding to a change in some motor vehicle state (such as vehicle speed, engine speed, or the like) that is to be displayed on the analog gauge instrument display, the stepper motor rotates a number of degrees, thereby causing the spur gear, and thus the drive belt and sun gear, to rotate through the appropriate angular rotation. Rotation of the stepper motor, in turn, thus causes the lens and associated needle to rotate, pointing the needle to the new, current value of the vehicular state.

Although the foregoing embodiment of the invention has been described with a motor, spur gear, drive belt, and sun gear drive train used to rotate the lens carrier ring, transparent lens and associated pointing indicia, other means of rotating the pointing indicia are also contemplated in accordance with the invention. For example, a motor and planetary gear drive train can be used in known fashion to rotate the lens carrier ring. In the preferred embodiment of the invention, as described, a spur gear, drive belt, and sun gear drive train used to rotate the lens carrier ring avoids gear on gear noise attendant with a gear to gear drive train. In addition, the preferred drive train provides ease of assembly, high tolerances to dirt and particles, and high tolerance to misalignment and subsequent shifting of component parts.

As illustrated in FIGS. 1–3, a completed single-needle analog instrument gauge display 10 can be mounted in an opening provided in an instrument panel 9. Bezel 12 seals the opening around analog instrument gauge display 10. A clear panel 8 (illustrated in FIG. 1) is provided between the driver and the analog instrument gauge display to isolate the display and to prevent dirt, dust, and the like from interfering with the workings of the analog instrument gauge display.

Figure 4:
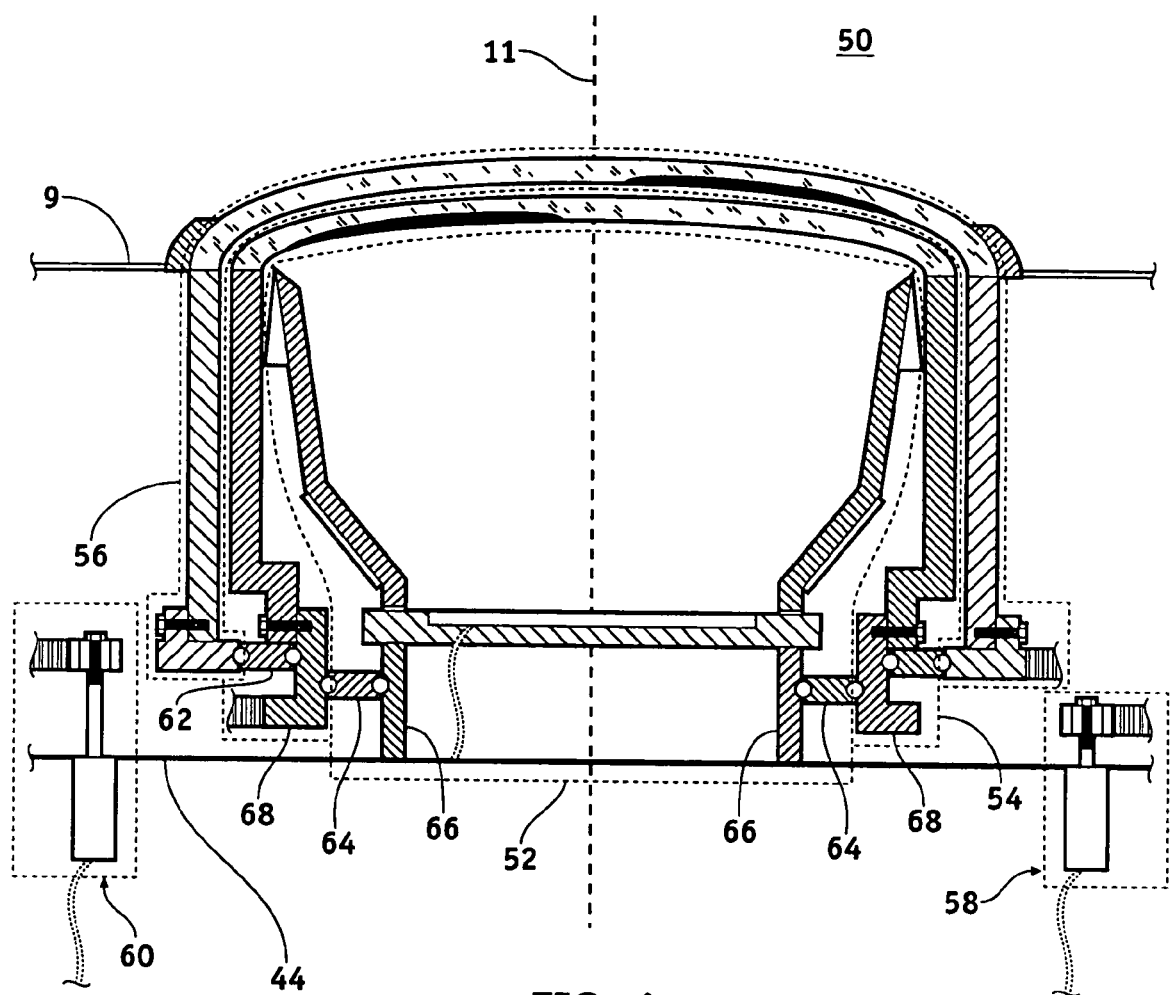
FIG. 4. Schematically illustrates, in cross-sectional view, a double-needle analog instrument gauge display in accordance with a further embodiment of the invention.

The present invention is not limited to single needle analog instrument displays, but can also apply to instrument displays utilizing a plurality of needles or other pointing indicia. A double-needle analog instrument gauge display 50, illustrative of a plural needle analog instrument display in accordance with a further embodiment of the invention, is illustrated in FIG. 4. In this illustrative embodiment, a double-needle analog instrument gauge display 50, namely an analog clock with a minute hand and an hour hand, is depicted. Those of skill in the art will recognize that the invention also encompasses an analog instrument gauge display 50 having any number of pointing indicia and is applicable to clocks and other gauges that necessitate the use of two or more pointing indicia.

As illustrated in FIG. 4, double-needle analog instrument gauge display 50 comprises five subassemblies: stationary gauge subassembly 52, rotating lens subassembly 54, rotating lens subassembly 56, stepper motor subassembly 58, and stepper motor subassembly 60. In accordance with the illustrated embodiment, rotating lens subassembly 54 and stepper motor subassembly 58 comprise the minute hand portion of the clock, and rotating lens subassembly 56 and stepper motor subassembly 60 comprise the hour hand portion of the clock. The operation and components of each subassembly is similar to the operation and components of analog instrument gauge display 10 described above, with the exception that there are now two stepper motor subassemblies and two rotating lens subassemblies. The two stepper motor subassemblies and rotating lens subassemblies operate independently of each other, except for the fact that, in this illustrative embodiment, stepper motor subassembly 60 rotates rotating lens subassembly 56 at a rate $1/60^{th}$ of the rate at which stepper motor 58 rotates rotating lens subassembly 54. As with analog instrument gauge display 10 described above, rotating lens subassembly 54 rotates on concentric bearing 64 against gauge mount tube 66 of stationary gauge assembly 52. Rotating lens subassembly 56 rotates on concentric bearing 62 mounted on rotating lens assembly 54, and preferably on sun gear 68 of rotating lens assembly 54. Bearing 62 is configured to constrain rotating lens assembly 56 to one degree of freedom (rotational). In accordance with a further, alternative embodiment of the invention (not illustrated), a 60:1 reduction gear can be used in place of stepper motor subassembly 60. In accordance with this embodiment of the invention, stepper motor 58 turns both rotating lens subassembly 54, and, through the 60:1 reduction gear, rotating lens subassembly 56. Rotating lens assembly 56 thus turns, as before, at $1/60^{th}$ the speed of rotating lens subassembly 54. In applications for which the plurality of pointing indicia display a function other than a clock function, the reduction gear need not be a 60:1 reduction gear, but instead can provide a gear reduction ration of x:1 as is appropriate to the displayed function.

In each of the embodiments described and illustrated above, the drive motor is configured to receive appropriate signals that control the rotation of the motor. These signals can be generated by the engine control module or other computer controller. The signals are generated in response to sensor inputs, clock inputs, or the like as appropriate to the function being displayed on the analog gauge instrument display. The engine control module or other computer control can be programmed in known manner to convert the sensor or clock inputs to the appropriate signals to control the drive motor.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof. For example, although specific mechanical implementations have been described and illustrated, those of skill in the art will appreciate that other equivalent implementations are also possible.

What is claimed is:

1. An analog gauge instrument display comprising:
   a first lens having a pointing indicia displayed thereon;
   a back plate having a pattern thereon; and
   a drive motor coupled to the first lens and configured to rotate the first lens and pointing indicia relative to the pattern in response to receipt of a signal.

2. The analog gauge instrument display of claim 1 wherein the drive motor comprises a stepper motor.

3. The analog gauge instrument display of claim 2 wherein the drive motor coupled to the first lens comprises a stepper motor, a first gear coupled to the stepper motor, a second gear coupled to the lens and an flexible belt passing over the first gear and the second gear.

4. The analog gauge instrument display of claim 3 wherein the first gear, the second gear, and the flexible belt comprise a double tooth gear set.

5. The analog gauge instrument display of claim 1 wherein the back plate further comprises a digital display visible behind the pointing indicia.

6. The analog gauge instrument display of claim 5 wherein the back plate and first lens comprise an analog tachometer and the digital display comprises a digital speedometer.

7. The analog gauge instrument display of claim 1 further comprising:

a second lens having a second pointing indicia thereon; and a second drive motor coupled to the second lens and configured to rotate the second lens and the second pointing indicia relative to the pattern in response to receipt of a second signal.

8. The analog gauge instrument display of claim 7 wherein the pattern comprises a clock face and wherein the pointing indicia and the second pointing indicia comprise an hour hand and a minute hand, respectively.

9. The analog gauge instrument display of claim 1 further comprising:

a second lens having a second pointing indicia thereon; and a second drive train coupled between the drive motor and the second lens.

10. The analog gauge instrument display of claim 9 wherein the drive motor is configured to rotate the first lens at a first rate of angular rotation and the second drive train is configured to rotate the second lens at a second rate of angular rotation different from the first rate of angular rotation.

11. The analog gauge instrument display of claim 10 wherein the second drive train comprises a 60:1 reduction gear.

12. An analog gauge instrument display for a dash board of a vehicle comprising:

a transparent gauge face having a pointing indicia thereon;
a hollow cylindrical gauge face carrier shaft coupled to the transparent gauge face;
a rigid mounting cylinder fixedly mounted to the vehicle;
a bearing positioned between the hollow cylindrical gauge face carrier shaft and the rigid mounting cylinder and configured to allow the hollow cylindrical gauge face carrier shaft to rotate with respect to the rigid mounting cylinder;
a back plate positioned within the hollow cylindrical gauge face carrier shaft and visible through the transparent gauge face;
a sun gear coupled to the hollow cylindrical gauge face carrier shaft;
a stepper motor configured to rotate in response to receipt of a signal;
a spur gear coupled to the stepper motor; and
a drive belt coupled to the spur gear and to the sun gear to cause rotation of the transparent gauge face in response to rotation of the stepper motor.

13. The analog gauge instrument display of claim 12 further comprising a pattern formed on the back plate.

14. The analog gauge instrument display of claim 12 further comprising a digital display positioned on the back plate.

15. The analog gauge instrument display of claim 12 further comprising:

a second transparent gauge face having a second pointing indicia thereon;
a second hollow cylindrical gauge face carrier shaft coupled to the second transparent gauge face;
a second bearing positioned between the second hollow cylindrical gauge face carrier shaft and the hollow cylindrical gauge face carrier shaft and configured to allow the second hollow cylindrical gauge face carrier shaft to rotate with respect to the hollow cylindrical gauge face carrier shaft;
a second sun gear coupled to the second hollow cylindrical gauge face carrier shaft; and
a drive train coupled to the second sun gear and configured to cause rotation of the second transparent gauge face.

16. The analog gauge instrument display of claim 15 wherein the drive train comprises:

a belt coupled between the second sun gear and the stepper motor; and
gears providing an x:1 gear reduction ratio.

17. The analog gauge instrument display of claim 15 wherein the drive train comprises a second stepper motor coupled to the second sun gear.

18. The analog gauge instrument display of claim 12 further comprising lighting configured to back light the transparent gauge face.

19. The analog gauge instrument display of claim 18 wherein the lighting comprises electroluminescent film applied to the back plate.

20. The analog gauge instrument display of claim 18 wherein the lighting comprises side lighting positioned within the hollow cylindrical gauge face carrier shaft.

21. An analog gauge instrument display for a motor vehicle dashboard comprising:

a transparent lens having a pointing indicia displayed thereon;
a stepper motor configured to rotate the transparent lens; and
a digital display positioned behind and visible through the transparent lens.

* * * * *